United States Patent [19]

Metzger et al.

[11] Patent Number: 5,515,513

[45] Date of Patent: May 7, 1996

[54] DISPOSITION FILTERING OF MESSAGES USING A SINGLE ADDRESS AND PROTOCOL TABLE BRIDGE

[75] Inventors: Stephen D. Metzger, Lancaster; Jeffrey A. Lomicka, Maynard; Gary Vacon, Melrose; Pat Gili, Westfield, all of Mass.

[73] Assignee: Digital Equipment Corporation, Maynard, Mass.

[21] Appl. No.: 410,546

[22] Filed: Mar. 23, 1995

Related U.S. Application Data

[63] Continuation of Ser. No. 161,690, Dec. 3, 1993, abandoned, which is a continuation of Ser. No. 682,187, Apr. 8, 1991, abandoned.

[51] Int. Cl.$^6$ .................... H04J 3/00; H04J 3/24; H04L 12/46
[52] U.S. Cl. .................... 395/200.15; 370/85.13; 364/DIG. 1; 364/229; 364/242.95; 364/DIG. 2; 364/949.91
[58] Field of Search .................... 395/200.16, 200.15; 370/85.13

[56] References Cited

U.S. PATENT DOCUMENTS

| | | | |
|---|---|---|---|
| 4,597,079 | 5/1986 | Kempf | 370/85.13 |
| 4,737,953 | 4/1988 | Koch et al. | 370/85.13 |
| 4,922,503 | 5/1990 | Leone | 370/85.13 |
| 5,027,350 | 6/1991 | Marshall | 370/85.13 |
| 5,050,165 | 9/1991 | Yoshioka et al. | 370/85.13 |
| 5,058,109 | 10/1991 | Goldberg et al. | 370/85.13 |
| 5,111,453 | 5/1992 | Morrow | 370/85.13 |
| 5,134,610 | 7/1992 | Shand et al. | 370/60 |
| 5,136,580 | 8/1992 | Videlock et al. | 370/60 |
| 5,151,897 | 9/1992 | Suzuki | 370/85.13 |
| 5,245,606 | 9/1993 | DeSouza | 370/85.13 |

OTHER PUBLICATIONS

"Media Access Control, (MAC) Bridges", IEEE Std 802.ID–1990 pp. 31–47.
"Advanced Computer Communication adds to its bridge–route product line" Computergram International, Feb. 28, 1991.
"3 Com bronter packages to support DECnet, IPX IS–to–IS", Digital Review, Jan. 28, 1991, p. 4.
"Cisco combines protocal translation, bridging, routing functions in two–part server." Digital Review, Jan. 21, 1991, p. 4.
"Bull routes offer system flexibility", Computing Canada Nov. 8, 1990, p. 28.
Wescon Conference Record, vol. 33, Nov. 1989, North Hollywood, CA, US pp. 235–239, Z. Amatai, "Address Filtering in FDDI LAN Bridges (The CAM Solution)".
Mini–Micro Systems, vol. 22, No. 2, Feb. 1989, Newton, MA, US, pp. 86–88; J. Weinstein, "Bridging to a Better Lan".
"Network Systems Series 6000 Bridge–Routers" *The Local-Netter*, Mar. 1991, v11 n3 p. 323.1.
"Probridge: Hughes LAN systems enhances product line", *Edge: Work–Group Computing Report*, Feb. 25 1991, v 2 n40 p. 20(1).

Primary Examiner—Thomas C. Lee
Assistant Examiner—D. Dinh
Attorney, Agent, or Firm—Cesari and McKenna

[57] ABSTRACT

An arrangement for selective filtering, e.g. one-way filtering, of messages received by a 2-port bridge from stations connected to two LANs of an extended LAN is provided. The bridge includes a message filtering database containing the addresses of all stations connected to one of the LANs. The database also contains a list of higher-level protocols employed by the stations. Associated with each protocol-type is information used by the bridge to dispose of the message. The message filtering database comprises a single table memory capable of supporting both ports of the bridge. The selective filtering process involves a two-step analysis by the bridge to determine whether to discard the message or forward it to another port. The analysis is based on a destination address and a protocol-type of the received message.

11 Claims, 7 Drawing Sheets

SYMMETRIC LAN CONFIGURATION

NON-SYMMETRIC LAN CONFIGURATION

DISPOSITION FILTERING OF MESSAGES USING A SINGLE ADDRESS AND PROTOCOL TABLE BRIDGE

This is a continuation of application Ser. No. 08/161,690, filed on Dec. 3, 1993, now abandoned, which is a continuation application of Ser. No. 07/682,187, filed on Apr. 8, 1991, now abandoned.

FIELD OF THE INVENTION

This invention relates generally to network communications and more specifically to an apparatus and method that provides selective filtering of messages transmitted over the network using a single address and protocol database table.

BACKGROUND OF THE INVENTION

A local area network (LAN) is a low-cost, high-performance medium capable of transmitting information at high transfer rates among stations located within a moderately sized geographic area. Information is usually transmitted in the form of messages over a physical medium, e.g. a cable, in a broadcast fashion. Stations coupled to the LAN are assigned unique addresses. Each message contains a source address of a transmitter station and a destination address of a receiver station. The message is captured by a station having an address that matches the destination address.

In addition to source and destination addresses, each message also includes a multibit protocol-type field. The protocol-type field contains a code identifying a higher-level protocol used in the message. This protocol identifies the type of message, the procedures for sending and receiving the message, and/or the way in which the message is to be interpreted. For example, a message may announce services offered by a station connected to the network and the protocol field may then indicate that it is a message of that type. The protocol-type field permits different protocols to coexist over a single transmission medium. A message announcing availability of a service will ordinarily be a multicast message. The multicast message is a message transmitted to every station connected to the network; each station then processes the message to determine whether it must respond.

A bridge is a device that connects two or more LANs so that a station on one LAN may communicate with a station on another. A collection of LANs interconnected by a bridge is called an extended LAN. The bridge receives and stores each message from a particular LAN and then determines whether the message is to be forwarded to another LAN. Thus, the bridge is a "store-and-forward" device that isolates traffic to those LANs to which the traffic is destined. This allows simultaneous traffic on the individual LANs and increases the utilization and throughput of the extended LAN.

Operationally, the bridge typically maintains an address table for each interface or port to a LAN, i.e. a table for each LAN to which the bridge is connected. The address table contains the addresses of all stations connected to the particular LAN. A message received on one LAN by the bridge is "filtered", i.e. either forwarded to another LAN or discarded, on the basis of its destination address. More specifically, the address is filtered according to whether there is a match between the destination address of the message and an address stored in an address table and, if so, the table in which the match appears.

The bridge also typically maintains a separate protocol-type table containing a list of the higher-level protocols accomodated by the respective stations connected to the extended LAN. As each message is received by the bridge, an independent determination is made whether to forward the message based on the protocol-type. That is, the protocol-type field of the message is compared against the protocol-type entries in the table. If there is a match, the message is either forwarded or discarded, depending upon the configuration of the bridge.

The forwarding determination is typically made by a processor in the bridge using a hashing function. Hashing is an efficient means of finding entries in a table, as compared to searching each entry. Generally, an algorithm applied to the protocol-type field produces an index. The index identifies the location of an entry in the table. The content of the entry is then compared to the protocol-type of the message.

This forwarding decision, also referred to as "protocol filtering" is multi-directional; if the protocol-type is found in the table, the message is either forwarded to every LAN connected to the bridge or completely discarded. If forwarded, the message may require some stations to perform unnecessary computations in order to process a request to which they will not respond. If the message is discarded, the transmitting station might not receive the response it seeks. This results in the inefficient use of system resources.

SUMMARY OF THE INVENTION

Briefly, an arrangement in accordance with the invention provides selective filtering, i.e. one-way filtering, of messages received by a 2-port bridge from stations connected to two LANs of an extended LAN. The bridge includes a message-filtering database containing the addresses of all stations connected to one of the LANs. The database also contains a list of higher-level protocols employed by the stations. Associated with each protocol-type is information used by the bridge to dispose of messages. The message-filtering component of the database comprises a single table memory capable of supporting both ports of the bridge. The selective filtering process involves a two-step analysis by the bridge to determine whether to discard a received message or forward it to another port. This analysis is based on the destination address and protocol-type of the message.

More specifically, the bridge couples a work group (WG) LAN to a backbone (BB) LAN to create the extended LAN. As each message is received by the bridge, the bridge initially compares the destination address of the received message against the station addresses contained in the database. The decision of whether to discard the message or to continue with the next step of the analysis is dependent on the contents of the database and the LAN from which the message was received.

For example, a message is received by the bridge from a station connected to the WG LAN. If the database contains the addresses of the stations connected to the WG LAN and the destination address of the received message is present in the database, the message is discarded by the bridge. Similarly, if the database contains the addresses of stations connected to the BB LAN and the destination address is not in the database, the message is discarded.

On the other hand, if the database contains the addresses of the stations connected to the WG LAN and the destination address of a message received over the WG LAN is not present in the database, the next step in the analysis is performed. Similarly, the message undergoes further scrutiny if the database contains the addresses of the stations connected to the BB LAN and the destination address of a message received from the WG LAN is present in the database.

In the next step of the analysis, the content of the protocol-type field of the message is compared against the protocol-type entries of the database. If there is no match between protocol-types, the message received over the WG LAN is forwarded to the BB LAN. If there is a match, the message is disposed of in accordance with associated disposition information stored in the bridge.

The bridge may dispose of a message in a number of ways depending upon the configuration and application of the extended LAN. Generally, the bridge may be instructed to discard the message if there is a match between the protocol types. Alternatively, the bridge may be directed to filter-out only multicast messages destined for all stations connected to the LANs. Another option may be to filter-out only the multicast messages directed to the work group stations. Lastly, the disposition information may cause the bridge to filter-out only the multicast messages intended for the backbone of the extended LAN.

An advantage of this arrangement is that, in one aspect of the invention, the bridge in accordance with the invention functions exactly as prior bridges having separate address and protocol tables. Moreover, the 2-port bridge described herein maintains only one table for the destination address database; prior 2-port bridges maintain two separate address tables, one for each port. This significantly reduces the cost of the bridge.

Another advantage of this arrangement involves one-way protocol filtering of messages transmitted over the extended LAN. One-way filtering isolates stations within a work group from certain transmitted messages, such as multicast messages. For example, a remote station seeking to bring a fresh operating system into its memory, i.e. seeking to "boot", transmits a multicast message requesting that a station provide an operating system image. Processing of this message by individual stations requires computations that consume time on those stations. One-way protocol filtering isolates the work group of stations from the message and thus increases the overall efficiency of the extended LAN by reducing unnecessary computations by the stations. Additionally, the invention reduces the traffic on particular LANs generated by the routing of multicast messages, thereby increasing the bandwidth of the network.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
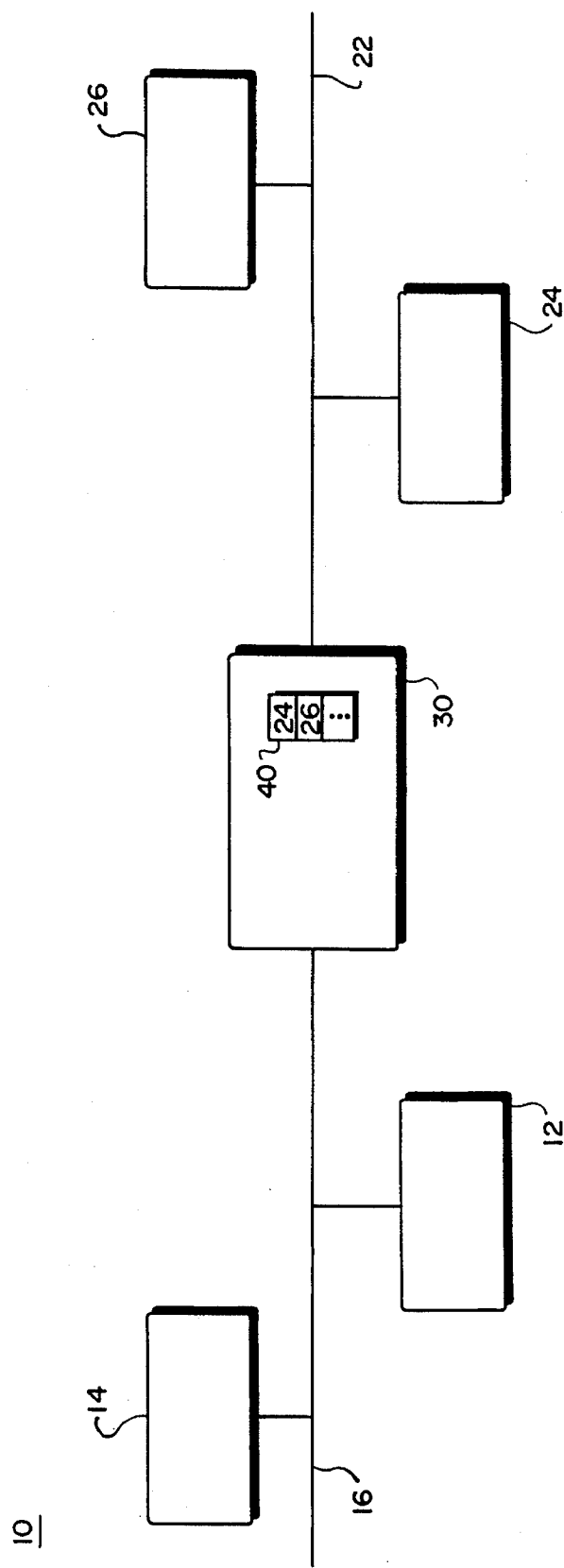
FIG. 1 is a diagram of an extended LAN configuration in which the bridging apparatus of the present invention may be advantageously used.

Referring to FIG. 1, an extended local area network (LAN) 10 includes two LANs, a backbone (BB) LAN 16 and a work group (WG) LAN 22, coupled by a 2-port bridge 30. The WG LAN 22 interconnects a relatively small group of stations, e.g. 24 and 26, while the BB LAN 16 generally interconnects a greater number of stations, some of which are represented at 12 and 14. A station may be any device ranging from a general-purpose, mainframe computer system to a simple data acquisition unit. However, the stations set forth herein are typically workstations or servers, each of which is configured to perform a specific function; they communicate among themselves by transmitting and receiving messages over the LANs.

The bridge 30 receives and stores all messages originating from stations 24 and 26 connected to the WG LAN 22 and then either discards them or forwards them to the BB LAN 16. The bridge 30 also receives messages from stations 12 and 14, and attends to these messages in a similar manner, i.e. either discards them or forwards them to the WG LAN 22. Specifically, the bridge 30 is a store-and-forward device that forwards only those messages destined for a LAN other than the one on which the messages originated. That is, the bridging arrangement in accordance with the invention provides selective filtering, i.e. one-way filtering, of messages received from the stations connected to the LANs.

In accordance with the invention, the bridge 30 includes a message filtering database containing the addresses of all stations connected to one of the LANs. The message filtering database comprises a single table memory 40 capable of supporting both ports of the 2-port bridge 30. The use of a single table memory bridge is based on the premise that the address of every station connected to the individual LANs of an extended LAN ultimately appear in one of two address tables of a prior art two-port bridge. Thus, if a particular address is not present in the single table memory of the invention, it would have been present in the other address table if the other address table existed. It follows that the presence or absence of an address in the single table indicates which LAN contains that address. Accordingly, the single table memory 40 stores and maintains addresses associated with one of the two ports connecting the bridge 30 to the LANs. In a preferred embodiment of the invention, the table 40 contains the addresses associated with the port connecting to the WG LAN 22.

Figure 2:
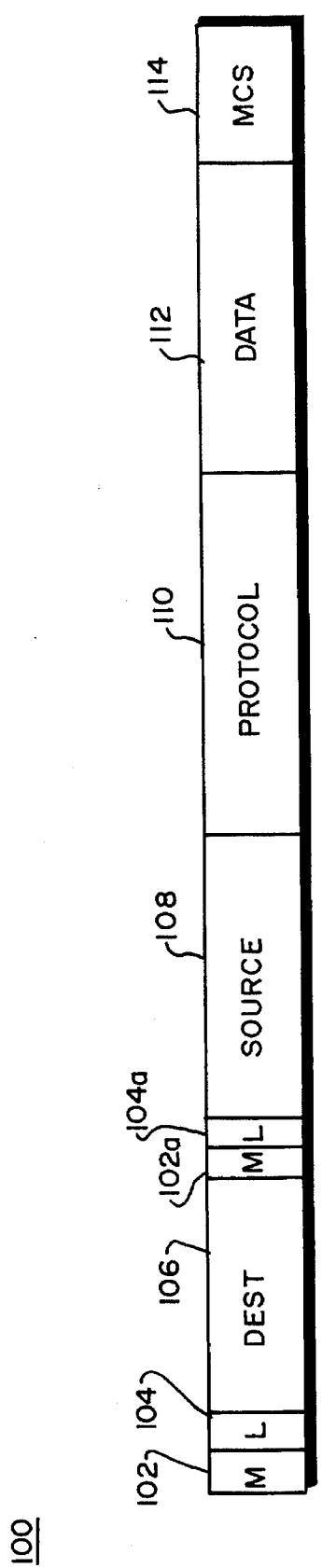
FIG. 2 is a diagram of a message used for communication in the extended LAN of FIG. 1.

The bridge 30 maintains the addresses in table 40 by monitoring the traffic of messages on the LANs. FIG. 2 illustrates portions of a message 100. The contents of field 106 comprise the destination address of the message 100. The field 108 contains the source address of the message 100. Included in fields 106 and 108 are two 1-bit fields: fields 102 and 102a, respectively, which contain a multicast message bit or flag, and fields 104 and 104a, which contain a locally administered message flag. The functions and purposes of these flags are described below. Field 110 identifies the higher-level protocol associated with the message 100 and the field 112 contains the data portion of the message. The remaining message check sequence field 114 contains a cyclic redundancy check (CRC) value that is used for detecting errors in the message 100.

Referring again to FIG. 1, the bridge 30 operates in part by obtaining the source address of each message 100 from the field 108. It also detects the port on which the message appeared. If a message 100 arrives at the port connecting WG LAN 22 and the source address 108 is not present in the table 40, the bridge 30 adds the address to the table 40. Thus, the bridge 30 is a "self-learning" bridge and ultimately, table 40 contains the addresses of stations 24 and 26.

The selective filtering of messages 100 performed by the bridge 30 involves a two-step analysis to determine whether to discard the message or forward it to another port. In general, the analysis involves both address filtering and protocol filtering; that is, the bridge 30 searches the table 40 for the destination address and protocol-type of the received message 100.

More specifically, the bridge 30 initially compares the destination address 106 of the message 100 with the entries of the table 40 to determine whether to discard the message or proceed with the next step of the analysis. The resulting decision is dependent on the direction of the received message 100. For example, the destination address 106 of a message 100 received from the WG LAN 22 is compared against the addresses stored in the table 40. If the destination address appears in the table 40, the message is discarded because the destination of the message is local to WG LAN 22. If the address is not found in the table 40, the bridge 30 proceeds with the next step of the analysis. This decision is premised on the assumption that the destination station is resident on BB LAN 16.

In contrast, a message 100 received by the bridge 30 on BB LAN 16 and having a destination address 106 that is present in the table 40 undergoes a subsequent analysis to determine whether it will be forwarded to WG LAN 22. If the destination address 106 is not present in the table 40, the bridge 30 operates under the assumption that the destination station is connected to BB LAN 16 and it therefore discards the message 100.

In accordance with the invention, the message filtering database of table 40 also contains a list of higher-level protocols accomodated by the stations. Associated with each protocol-type is information used by the bridge 30 to dispose of the message 100. A message that passes the address filtering stage thereafter has its protocol-type examined by the bridge 30. More specifically, the content of the protocol-type field 110 of the message 100 is compared against the protocol-type entries of the table 40. If there is no match with one of the protocol-types, the message 100 is forwarded to the other LAN. If there is a match, the message 100 is disposed of by the bridge 30 in accordance with the associated disposition information. An example of protocol-filtering is provided in connection with FIG. 6.

Figure 3:
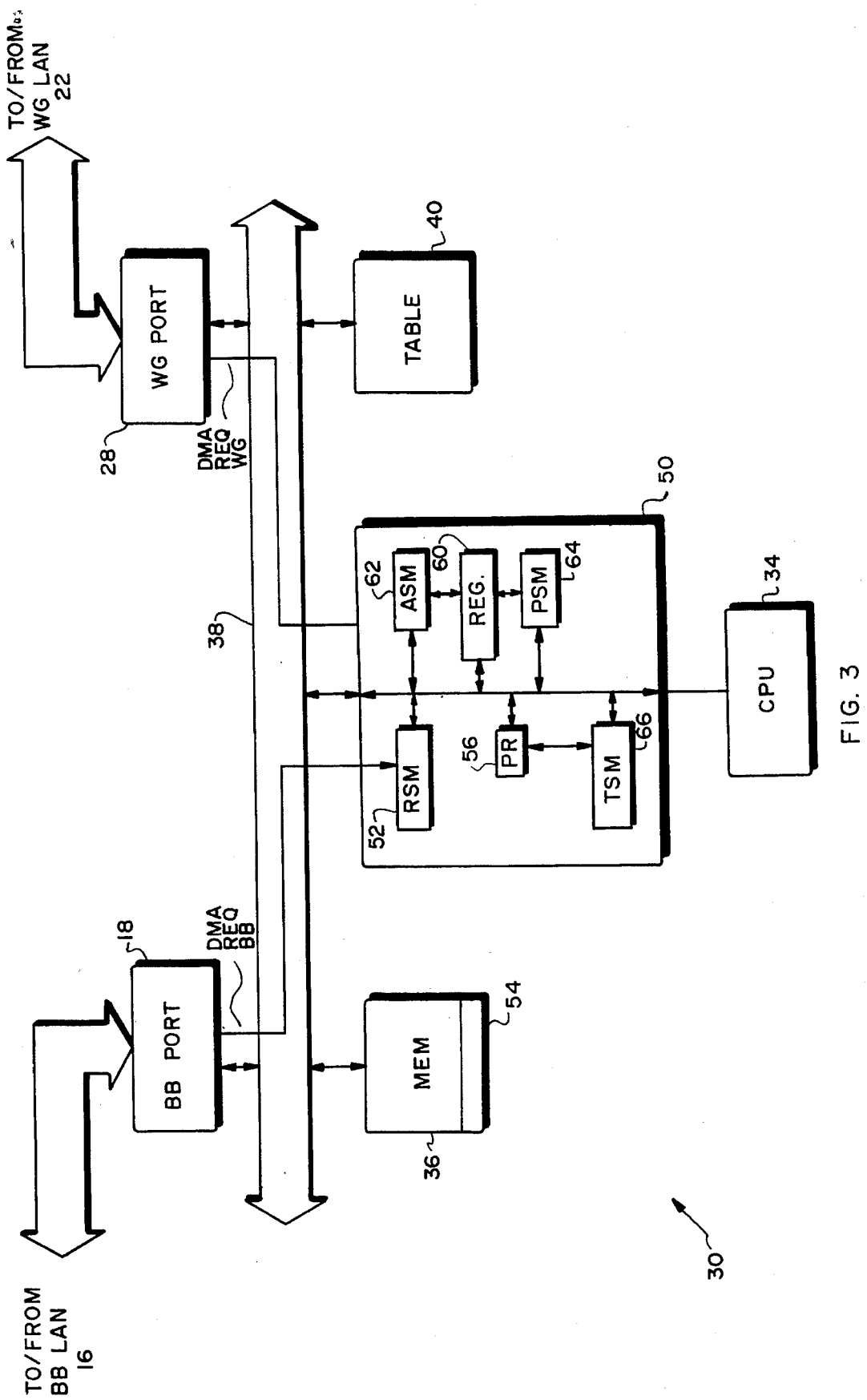
FIG. 3 is a diagram of the bridging apparatus of FIG. 1.

FIG. 3 is a diagram of the bridge 30. A processor (CPU) 34 is primarily responsible for initializing the various components of the bridge 30 and executing error routines in response to the components' service requests. Two port controllers, i.e. a BB port controller 18 and a WG port controller 28, receive and transmit messages 100 on the respective LANs 16 and 22. To that end, the port controllers 18 and 20 include transceiver and decoding circuits, in addition to the logic required to perform direct memory access (DMA) operations in a memory unit 36 via a bus 38. The memory unit 36 is preferably a random access memory (RAM) array capable of temporarily storing incoming messages 100 from the LANs 16 and 22.

A control unit 50, including logic circuits functioning as independent state machines, performs the operations associated with the message filtering function of the bridge 30. More specifically, the control unit 50 responds to DMA requests from the port controllers 18 and 28 by allocating a portion of the memory 36, called a "page", for the storage of a received message 100. It performs the address comparison between the destination address 106 of the received message 100 and the address contents of the table 40. Additionally, it executes the comparison operation between the protocol-type 110 of the received message 100 and the protocol-type contents of the table 40, if needed. The control unit 50 also disposes of the message 100 in accordance with results of the comparisons.

Figure 4:
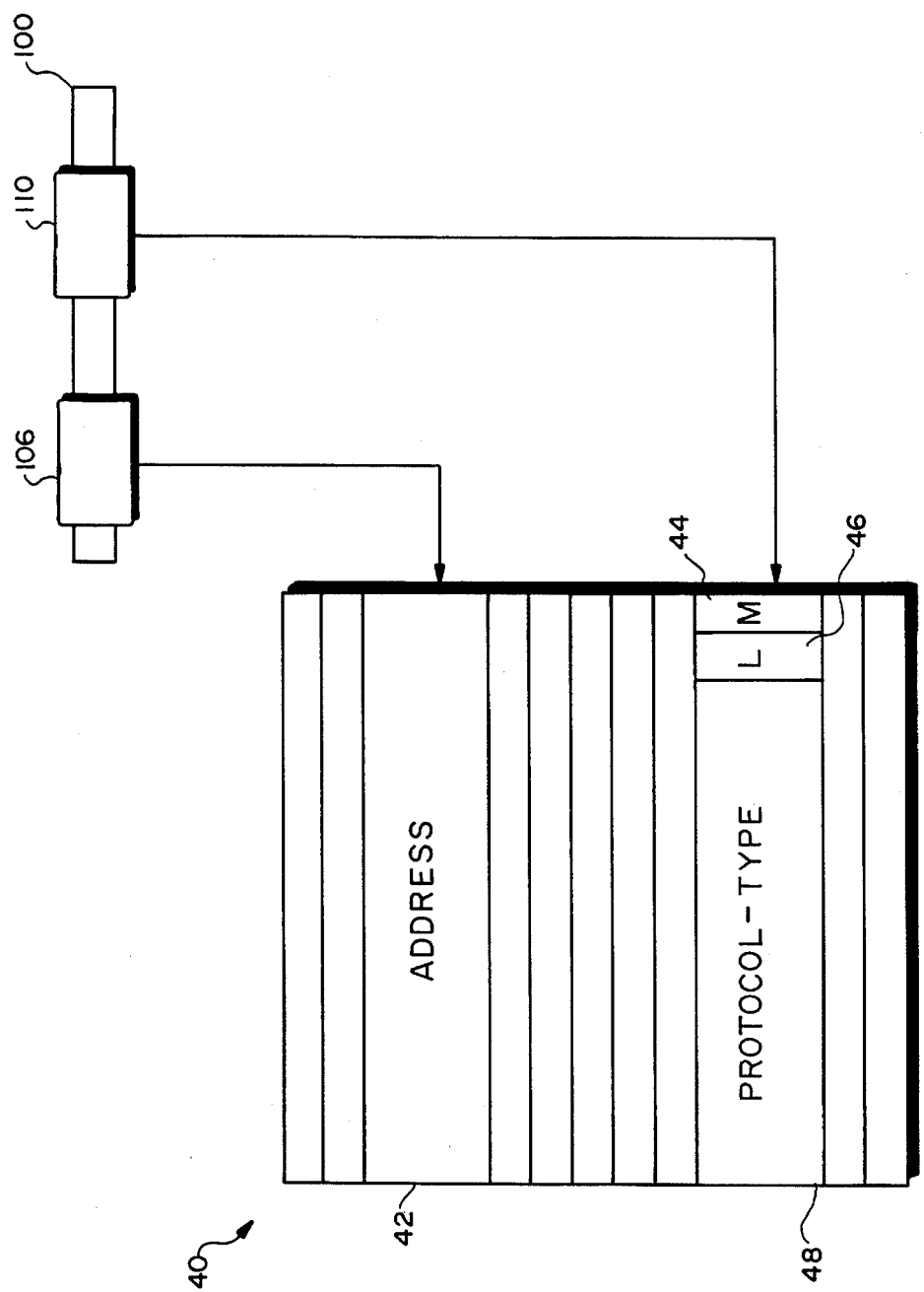
FIG. 4 is a diagram of a message filtering database contained in a single table in accordance with the invention.

FIG. 4 depicts the single address and protocol table 40 Of bridge 30. The bridge 30 maintains only one table 40 for the source address database. Moreover, a single table 40 is utilized for both the address and protocol-type databases of bridge 30. This is because the entries of the protocol database include flags that distinguish protocols from addresses; accordingly, these entries will not appear as addresses when the table 40 is searched for destination addresses. The single address/protocol table significantly reduces the cost of the bridge.

More specifically, the message filtering database in table 40 includes address entries 42 and protocol-type entries 48. Associated with each protocol-type entry 48 is disposition information located elsewhere in the memory unit 36. Each entry of the table 40 includes a multicast message flag 44 and a locally administered address flag 46. The multicast message flag 44 identifies a message having a group address for transmission to every station connected to the network. The locally administered flag 46 identifies an address as one assigned to a station within a particular (isolated) LAN, i.e. "locally administered". The address entries 42 of table 40 are the source addresses of individual stations connected to one of the LANs, e.g. the WG LAN 22. If a message 100 is received with the multicast message flag 102a set in the source address 108, that source address is not stored in the table 40. If a message 100 is received with the multicast message flag 102 set in the destination address 106, the destination address is not compared against the address entries 42 of the table 40 because the message is intended for all stations. Therefore, an entry with the flags 44 and 46 set cannot be a source address (or address directed to the bridge 30); in accordance with the invention, it is designated a protocol-type entry 48.

The table 40 is preferably implemented as a content addressable memory (CAM). A CAM reduces the time required to find an entry stored in a table by accessing all entries simultaneously and in parallel on the basis of data content rather than by specific location in the memory. Thus, the destination address 106 of each message 100 is quickly compared against each of the address entries 42 stored in table 40. Similarly, the content of the protocol-type field 110 of each message 100 is compared against the contents of the protocol-type entries 48, thereby eliminating the need for a hashing function to search the table 40. If there is a protocol-type match, the address of the matched entry, i.e. an index, is used by the control unit 50 to locate the associated disposition information in memory 36. The message 100 is then disposed of according to the disposition information.

Specifically, the bridge 30 may dispose of a message 100 in a number of ways depending upon the configuration and application of the extended LAN 10. Generally, the bridge 30 may be instructed to discard or completely filter-out the message 100 if there is a protocol-type match. Alternatively, the bridge 30 may be directed to filter-out only multicast messages destined for all of the stations connected to the extended LAN 10. Another option may be to filter-out only the multicast messages directed to the WG LAN 22. Lastly, the disposition information 44 may configure the bridge 30 to filter-out only the multicast messages intended for the BB LAN 16 of the extended LAN 10.

The operation of the bridge 30 in FIG. 3 will now be described with respect to the following example. A message 100 is received by the BB port controller 18, which then asserts a DMA REQ BB signal to a receive state machine (RSM) 52 in the control unit 50. The assertion of DMA REQ BB informs the control unit 50 that the message is received from the BB LAN 16; this information is important to the message filtering determination. The RSM 52 then responds with a DMA acknowledgement that includes the address of a page in the memory 36. The control unit 50 maintains an external data structure, i.e. a stack 54, of page addresses in memory 36 available for allocation to the port controllers 18 and 28. The stack 54 is located in the memory 36. A pointer register 56 "points" to the address of the currently allocated page of memory 36. The RSM 52 then enables the appropriate RAM devices in the memory 36 to receive the message 100.

Upon receiving the DMA acknowledgement, the BB port controller 18 commences transfer of the received message 100 to the memory unit 36. The destination address field 106 of the message 100 is initially transferred over the bus 38, followed by the source address field 108, the protocol-type field 110 and the message check sequence field 114. As the destination address is received by the memory 36, it is simultaneously captured by the control unit 50 and temporarily stored in an internal register 60. An address state machine (ASM) 62 then compares the destination address 106 against the address entries of the table 40. More specifically, the address comparison operation (and, later, the protocol comparison operation) is time-multiplexed over bus 38 with the on-going DMA operation so that the two operations effectively occur concurrently.

The source address is then transferred to the memory unit 36 and simultaneously received by the control unit 50. The source address is stored in the internal register 60 until the contents of the field 114 of the message 100 is received by control unit 50, at which time the message is checked for errors. The protocol-type field 110 is also captured by the control unit 50 while being transferred to the memory unit 36. A protocol state machine (PSM) 64 compares the protocol-type field 110 against the protocol-type entries in the table 40. Thereafter, the data field 112 of the message 100 is transferred only to the memory 36.

If the message 100 is free of errors, the control unit 50 then examines the source address. Since this particular message 100 originated in the BB LAN 16, the source address 108 is not stored, i.e. "learned" in the table 40. However, if the source address is present in the table 40, it must be removed by the control unit. This process, also known as migration monitoring, ensures the accuracy of the database in the event a station is moved from one LAN to the other.

If the results of the address and protocol comparison indicate that the message is to be forwarded to the WG LAN 22, a transmit state machine (TSM) 66 in the control unit 50 transfers the page address stored in the pointer register 56 to the WG port controller 28. The controller 28 then retrieves the contents of the location in the memory 36 and transfers the message 100 over the WG LAN 22 to the destination station. The TSM 66 thereafter deallocates the memory page by placing its address onto the stack 54. If the results of the comparison indicate that the message is to be discarded, the page of memory 36 is likewise deallocated by the TSM 66 without transferring its contents to the WG port controller 28.

Figure 5:
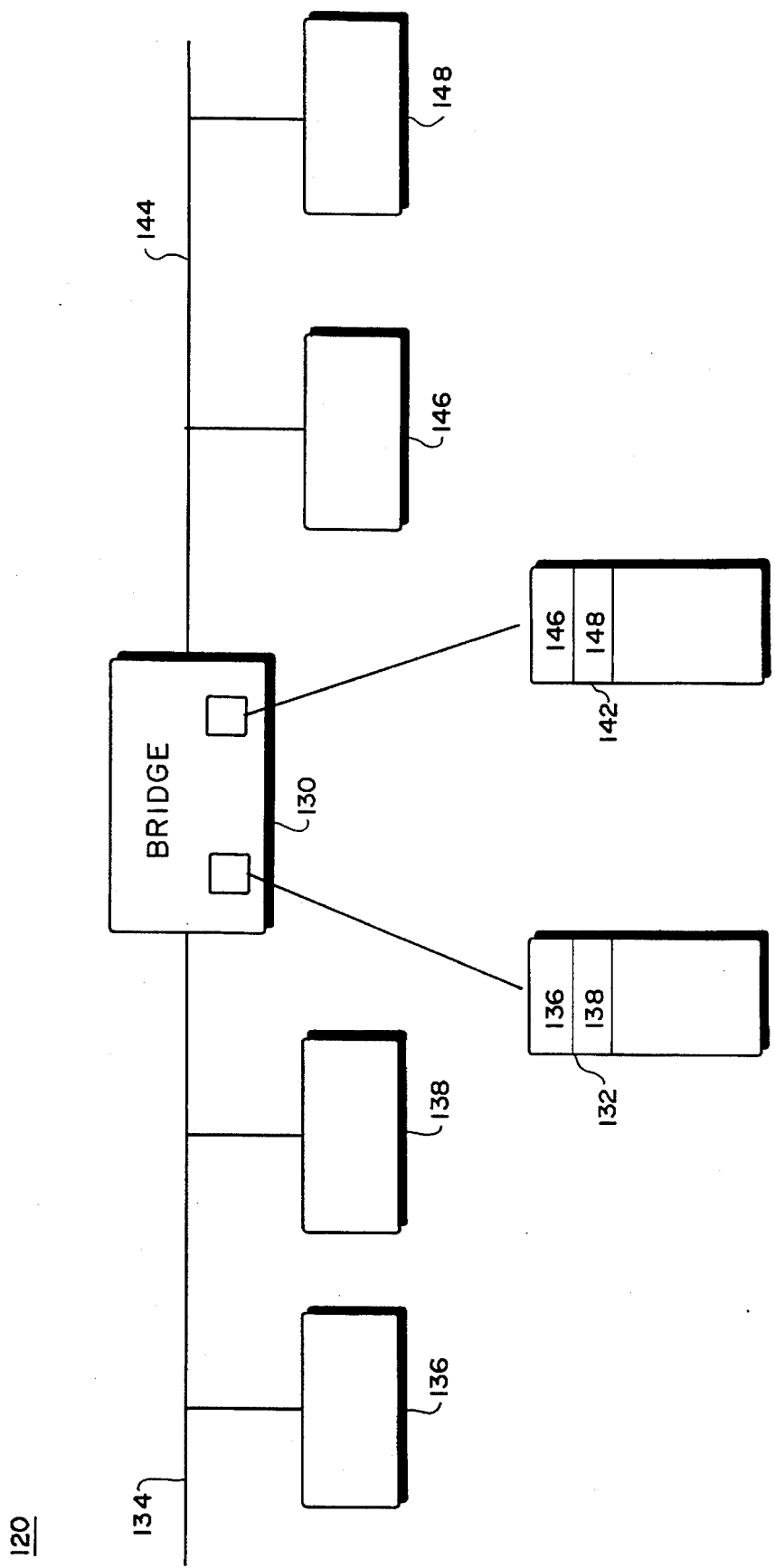
FIG. 5 is a diagram of an extended LAN using a prior art bridge.

In accordance with one aspect of the invention, the bridge 30, having a single address/protocol table 40, functions exactly as prior 2-port bridges having two separate address tables. FIG. 5 depicts an extended LAN 120 including a prior art, 2-port bridge 130. The bridge 130 includes an address table for each of its ports, e.g. address table 132 for the port coupling LAN 134 and address table 142 for the port coupling LAN 144. Address table 132 contains the addresses of stations 136 and 138 connected to the LAN 134, while the address table 142 contains the addresses of stations 146 and 148. The bridge 130 either forwards or discards a received message after searching both tables for the messages's destination address. When forwarded, the message is transferred to the port associated with the address table having a matched address.

For example, station 148 transmits a message to station 146. The bridge 130 stores the message and compares its destination address to the addresses in the tables 132 and 142. A match occurs in the address table 142; thus, the bridge 130 does not forward the message because the message is local to LAN 144. If, however, the destination address is station 136, a match ensues in the address table 132 and the bridge 130 forwards the message to the LAN 134. Thus, the bridge 130 functions in a manner similar to the bridge 30 in accordance with the invention. However, the prior art bridge 130 requires additional memory capacity to store the addresses of every station in the extended LAN 120. Such a requirement may be a cost-limiting factor, since a typical extended LAN may contain 4000 to 10,000 stations.

In contrast, there is no limit on the total number of stations connected to the BB LAN 16 of FIG. 1. Since the invention set forth herein does not store and maintain station addresses connected to BB LAN 16, there can be an unlimited number of stations connected to it. Only the WG LAN 22 is bounded by the available storage capacity of table 40.

In another aspect of the invention, the single address/ protocol table arrangement may be extended to a multiple "bridging" topology. This arrangement exploits the protocol filtering technique described herein to allow one-way connectivity based on multicast messages. The stations connected to an extended LAN use multicast messages to initiate connections to other stations on the network. In general, if the protocol-type of a multicast message is found in the single address/protocol table, a bridge in accordance with the invention may allow initiation of a connection from one port to the other, but may prevent initiation of a connection in the other direction.

Figure 6:
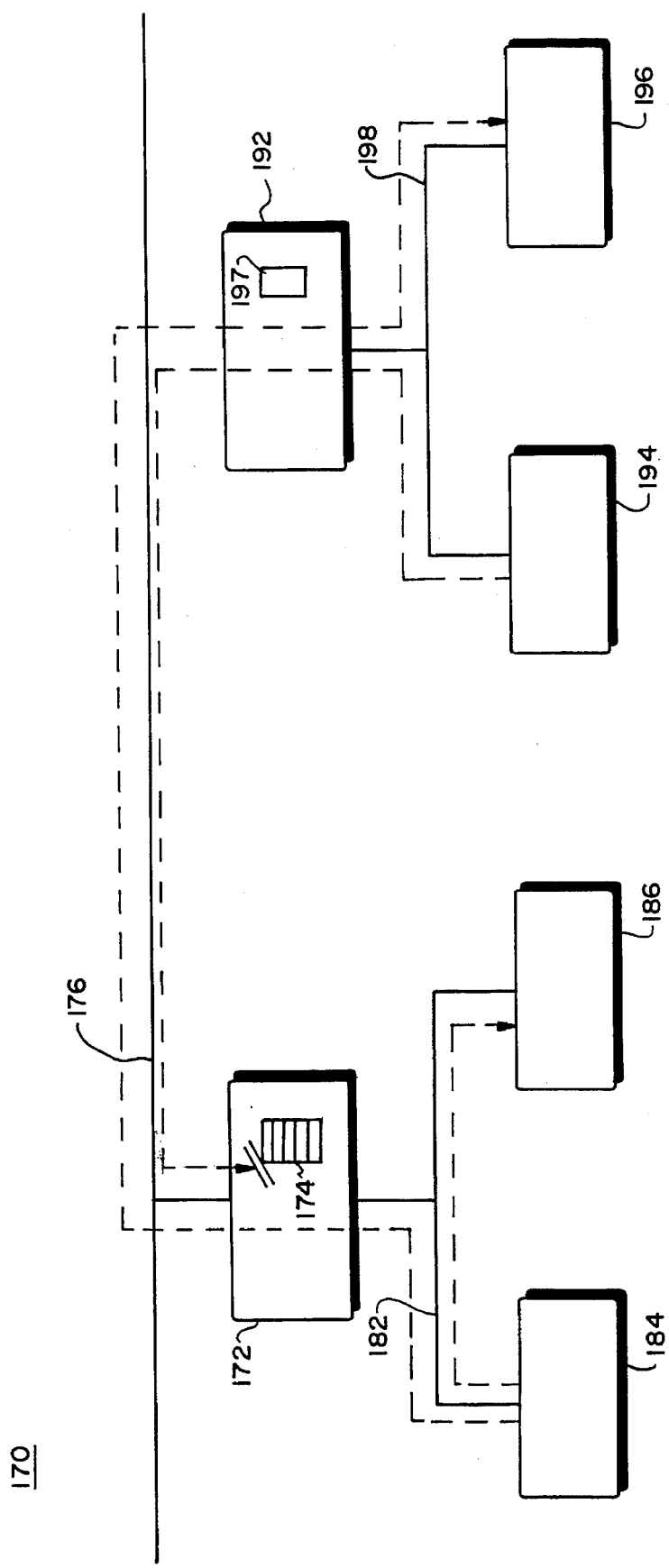
FIG. 6 is a diagram of an alternate embodiment of an extended LAN configuration using multiple bridges in accordance with the invention.

As an example, refer to the diagram of FIG. 6. An extended LAN 170 includes two LANs, a BB LAN 176 and a WG LAN 182, coupled to a 2-port bridge 172. The WG LAN 182 interconnects stations 184 and 186 to provide a first level of communication among the stations. A second level of communication is provided when WG LANs 182 and 198 are interconnected to the BB LAN 176 via bridges 172 and 192, respectively. Stations 194 and 196 are connected to WG LAN 198.

The configuration of the extended LAN 170 distributes the message filtering function among a series of bridges to isolate traffic at the WG LAN level; in other words, messages originating in stations connected to one WG LAN may be forwarded to stations connected to another WG LAN based on the destination addresses and protocol-types of the messages. Accordingly, a very large network with many stations can be constructed using bridges, each of which has a single address/protocol table with relatively few entries.

The address/protocol table 174 of bridge 172, which is similar to the table 40 depicted in FIG. 4, stores addresses of the stations 184 and 186 connected to the WG LAN 182. The table 174 also contains identification of the protocol-types existing within the stations 184 and 186. A message 100, having the flag in its multicast message field 102 set, is received from the BB LAN 176. The content of the destination address field 106 is not compared against the addresses stored in the table 174 because the message specifices a multicast mode; therefore, the protocol-type field 110 of the message 100 is examined by the bridge 172.

The content of the field 110 identifies a particular protocol used by the transmitting station, e.g. a local area transport (LAT) protocol. That content is compared against the protocol-type entries of the address/protocol table 174. A resulting match leads the bridge 172 to the memory 36 to examine the disposition information associated with the protocol-type entry. For this example, the disposition information directs the bridge 172 to dispose of the message as "multicast messages in that protocol to the work group not allowed".

The bridge 172 is thus configured to completely filter-out LAT protocol multicast messages headed for the WG LAN 182; yet the bridge 192 need not be so configured. In this example, stations 184 and 194 connected to WG LANs 182 and 198, respectively, are workstations, while the stations 186 and 196 are terminal servers. Each workstation from time to time transmits a multicast message intended for the servers. The multicast message transmitted by workstation 184 is received by terminal server 186 and bridge 172. Bridge 172 thereafter forwards the message to the terminal server 196 over the BB LAN 176 and by way of bridge 192. However, the message transmitted by workstation 194 is completely filtered-out by bridge 182 and does not reach terminal server 186.

Accordingly, the terminal server 186 can communicate with the workstation 184 because they are connected to the same LAN 182; but, terminal server 186 cannot communicate with the workstation 194 in a multicast mode because the multicast message is blocked by the bridge 172. The workstation 194 is thus prevented from announcing its presence to and receiving service from the server 186.

The one-way protocol filtering technique increases the efficiency of the system by reducing traffic on the individual LANS and by reducing the number of messages processed by individual stations connected to them. One-way filtering also provides an increased level of security to the extended LAN by limiting access to certain resources from one direction, while permitting access in the other.

Figure 7:
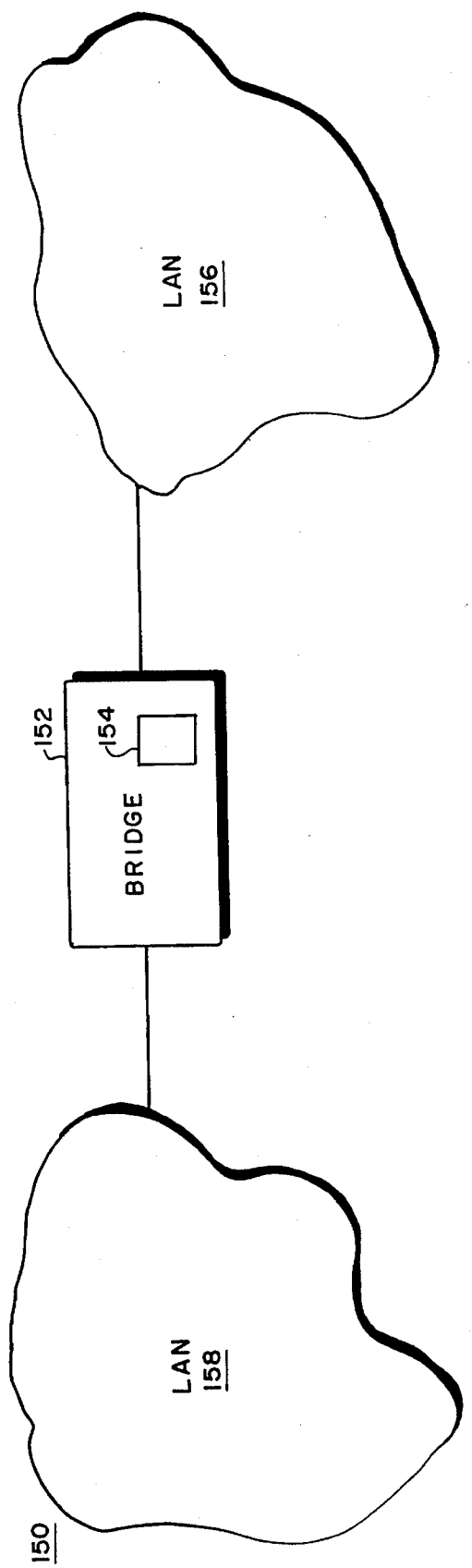
FIG. 7 is a diagram of a symmetrical extended LAN configuration using the bridging apparatus of FIG. 3.

Refer now to FIG. 7. In an alternate embodiment of the invention, a bridge 152 forms the nucleus of an extended LAN 150. The network is configured symmetrically, i.e. approximately half of the stations in the extended LAN 150 are connected to a LAN 156 and the other half are connected to a LAN 158. Here, the address/protocol table 154 of bridge 152 requires sufficient storage capacity for the addresses and protocol-types of the stations connected to LAN 156, for example.

Figure 8:
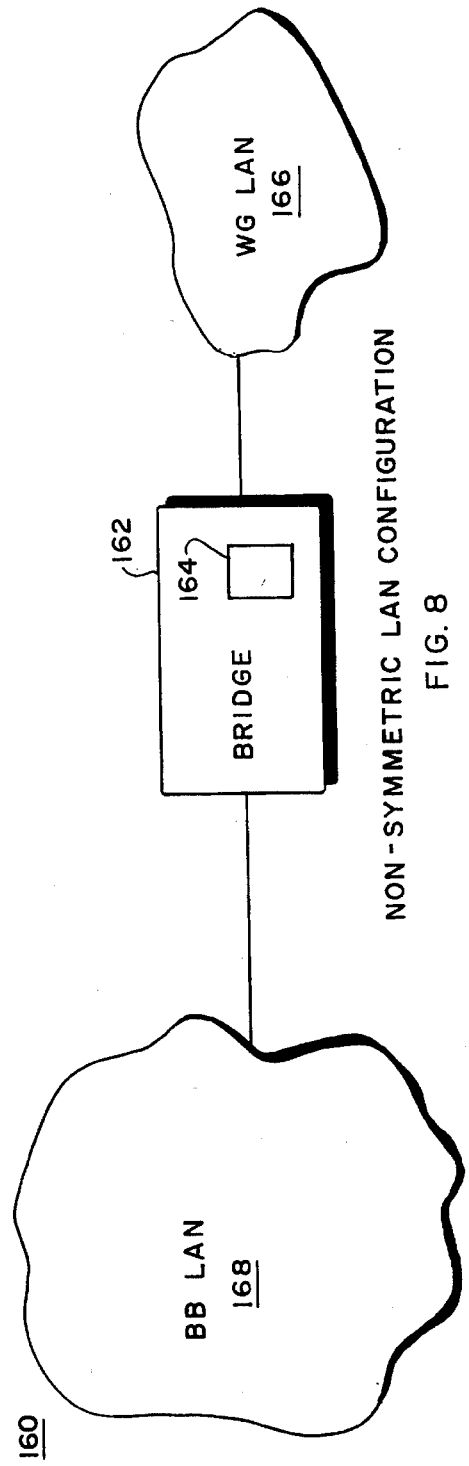
FIG. 8 is a diagram of a non-symmetrical extended LAN configuration using the bridging apparatus of FIG. 3.

The extended LAN 160 configuration depicted in FIG. 8 is typical of large networks, i.e. the majority of stations are connected to one LAN, e.g. BB LAN 168, while the remainder are connected to the WG LAN 166. In this embodiment of the invention, the single address/protocol table 164 of bridge 162 need maintain only a relatively small number of address and protocol entries, i.e. those of the LAN 166 stations, resulting in a very substantial cost saving.

·The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. Bridging apparatus having two ports for coupling to a first medium and a second medium, said apparatus providing selective filtering of messages transmitted between stations on said media, each of said messages including a destination address and a protocol-type code, said apparatus comprising:

means for receiving a message from said first medium;

a single content addressable memory (CAM) table for storing a message filtering database, said single CAM table having a plurality of database entries capable of supporting each of the two ports of said apparatus, said database entries including:

a first portion of entries containing addresses of the stations connected to only one of said first and second media; and a second portion of entries containing protocol-types within the stations connected to said first and second media, said second portion of entries having asserted first and second flags to distinguish said protocol-types from said addresses;

storage means for storing disposition information associated with each of said protocol-types stored in said database entries;

means for comparing said received message with said addresses and protocol-types stored in said database entries; and means responsive to said comparison means for selectively disposing of each received message in accordance with said disposition information, said selectively disposing means forwarding said message to said second medium when one of:

said protocol-type of said message does not match one of said protocol-types of said database entries; and said protocol-type of said message matches one of said protocol-types of said database entries and said disposition information associated with said protocol-type specifies forwarding said message to said second medium.

2. A bridge for coupling a first network to a second network, said bridge comprising:

a bus;

a message filtering database coupled to said bus, said message filtering database having a plurality of database entries including:

address entries containing addresses of the stations connected to one of said networks; and protocol-type entries containing protocol-types within the stations connected to said one network;

a memory, coupled to said bus, for storing disposition information associated with each of protocol-type entry;

a plurality of port controllers, coupled to said bus, for receiving and transmitting a message between said networks, said port controllers configured to perform direct memory access (DMA) requests in said memory; and a multi-stage control unit, coupled to said bus, for executing message filtering operations of said bridge in response to said DMA requests.

3. The bridge of claim 2 wherein said multi-stage control unit comprises a memory allocation stage for responding to DMA requests from said port controllers in response to reception of said message, said memory allocation stage initiating time-multiplexed transfer of said message over said bus to said memory.

4. The bridge of claim 3 wherein said multi-stage control unit further comprises an address filtering stage, coupled to said memory allocation stage, for executing time-multiplexed comparison operations between a destination address of said message and said address entries of said database over said bus.

5. The bridge of claim 4 wherein said multi-stage control unit further comprises a protocol-type filtering stage, coupled to said address filtering stage, for executing time-multiplexed comparison operations between a protocol-type of said message and said protocol-type entries of said database over said bus in response to a match between said destination address and one of said address entries.

6. The bridge of claim 5 wherein said multi-stage control unit further comprises a message disposition stage for disposing,of said message in accordance with results of said address filtering and protocol-type filtering stages.

7. A bridge for coupling a first network to a second network, said bridge comprising:

a bus;

a message filtering database coupled to said bus, said message filtering database having a plurality of database entries including:

address entries containing addresses of the stations connected to one of said networks; and protocol-type entries containing protocol-types within the stations connected to said one network;

a memory, coupled to said bus, for storing disposition information associated with each of protocol-type entry;

a plurality of port controllers, coupled to said bus, for receiving and transmitting a message between said networks, said port controllers configured to perform direct memory access (DMA) requests in said memory; and a multi-stage control unit, coupled to said bus, for executing message filtering operations of said bridge, said control unit including:

a memory allocation stage for responding to DMA requests from said port controllers in response to reception of said message, said memory allocation stage initiating time-multiplexed transfer of said message over said bus to said memory;

an address filtering stage, coupled to said memory allocation stage, for executing time-multiplexed comparison operations between a destination address of said message and said address entries of said database over said bus;

a protocol-type filtering stage, coupled to said address filtering stage, for executing time-multiplexed comparison operations between a protocol-type of said message and said protocol-type entries of said database over said bus in response to a match between said destination address and one of said address entries; and a message disposition stage for disposing of said message in accordance with results of said address filtering and protocol-type filtering stages.

8. A method for filtering a message received at a bridge from a source station coupled to a first network and destined for a destination station coupled to a second network, said bridge connecting the first network to the second network, said method comprising the steps of:

(A) comparing a destination address of the received message with address entries contained in a message filtering database, said message filtering database containing only addresses of stations connected to the first network;

discarding the received message if said destination address of the received message matches any of said address entries contained in said message filtering database;

(B) comparing a protocol-type of the received message with protocol-type entries contained in said message filtering database if said destination address of the received message does not match any of said addresses contained in said message filtering database;

forwarding the received message to the second network if said protocol-type of the received message does not match any of said protocol-type entries contained in said message filtering database; and disposing of the received message in accordance with disposition information, associated with each of said protocol-type entries, stored in said bridge if said protocol-type of the received message matches any of said protocol-type entries contained in said message filtering database.

9. The method of claim 8 wherein said step of disposing of the received message in accordance with said disposition information comprises the step of discarding the received message.

10. The method of claim 8 wherein said step of disposing of the received message in accordance with said disposition information comprises the step of discarding the received message only if the message is a multicast message.

11. Bridging apparatus having two ports for coupling to a first medium and a second medium, said apparatus providing selective filtering of messages transmitted between stations on said media, each of said messages including a destination address and a protocol-type code, said apparatus comprising:

A. means for receiving a message from said first medium;

B. a single table for storing a message filtering database, said single table having a plurality of database entries capable of supporting each of the two ports of said apparatus, said database entries comprising B1. a first portion of entries containing addresses of the stations connected to only one of said first and second media; and B2. a second portion of entries containing protocol-types within the stations connected to said first and second media, C. storage means for storing disposition information associated with each of said protocol-types stored in said database entries;

D. means for comparing said received message with said addresses and protocol-types stored in said database entries;

E. means responsive to said comparison means for selectively disposing of each received message in accordance with said disposition information by forwarding said message to said second medium when one of said protocol-type of said message does not match one of said protocol-types of said database entries; and
said protocol-type of said message matches one of said protocol-types of said database entries and said disposition information associated with said protocol-type specifies forwarding said message to said second medium.

* * * * *